United States Patent Office 3,780,096
Patented Dec. 18, 1973

3,780,096
PROCESS FOR RECOVERING COBALT AND MANGANESE OXIDATION CATALYSTS
Thomas F. Johnson, Penn Hills Township, Allegheny County, and James H. Schelling, Franklin Township, Westmoreland County, Pa., assignors to United States Steel Corporation
No Drawing. Filed July 1, 1971, Ser. No. 159,014
Int. Cl. C07c 63/02; C01g 45/00, 51/00
U.S. Cl. 260—524 R
2 Claims

ABSTRACT OF THE DISCLOSURE

A mineral acid is added to a mixture containing an oxidation catalyst and a carboxylic acid to precipitate the oxidation catalyst.

BACKGROUND OF THE INVENTION

Processes for the liquid phase oxidation with molecular oxygen of aliphatic substituted aromatic hydrocarbons to aromatic carboxylic acids are now well established. Generally, the reaction system comprises an aliphatic acid solution of an alkyl-aromatic, catalyzed by a combination of cobaltous and manganous acetates with a bromine promoter, such as ammonium bromide. U.S. Pat. 2,833,816 describes a successful application of this process which has been used to produce isophthalic and terephthalic acids from xylene. It is contemplated that the process will also be useful in the preparation of other carboxylic acids and anhydrides from the appropriate alkyl-aromatic compounds. The oxidation may also take place in xylene or toluene rather than in an aliphatic acid solution. Catalysts used for the oxidation are cerium, neodymium, vanadium, cobalt and manganese compounds.

It is desirable to recover the catalyst from the reaction mixture for regeneration of the catalyst and recycle to the oxidation step. Several systems have been devised for the recovery of catalysts from the reaction mixture. In an oxidation process without aliphatic acid solvent, an early catalyst-recovery method was described in U.S. Pat. 2,680,757. Xylene-soluble cobalt toluate catalyst was separated as insoluble cobalt toluate hydrate by treatment with water. This procedure will not work in a system using an aliphatic acid solvent because the normal form of fresh catalyst used is the metal acetate tetrahydrate, which is very soluble in the reaction mixture. In U.S. Pat. 2,865,-708, xylene-soluble cobalt toluate was separated as insoluble cobalt salts of phthalic acid isomers in admixture with other insoluble products from the oxidation of xylenes. This procedure will not work in aliphatic acid solution, because the cobalt salts referred to above are soluble in the reaction mixture. Belgian Pat. 624,620 teaches the use of cation exchange resins to separate cobalt catalyst from toluene-benzoic acid mixture. While this procedure could be adapted to other oxidation systems, each system would require a special development program for selection of a suitable combination of resin and reaction conditions, and a substantial capital investment in resin and equipment for its use.

In oxidations run in aliphatic acid solution, two recovery methods were developed by Standard Oil Company (Indiana). The first, U.S. Pat. 2,964,559, teaches evaporation of the acetic acid solution, containing the catalysts and reaction products and by-products, essentially to dryness. The crude residue that remains is then pulverized and subjected to a lengthy extraction, with water or glacial acetic acid, followed by filtration to separate insoluble tars and by-products from the soluble catalyst salts. This method has the disadvantage of starting with the catalyst salts contaminated with all of the non-volatile by-products from the oxidation, some of which are recovered with the catalyst. Besides the time involved, this recovery method involves many extra processing steps for dehydration, pulverization, digestion and filtration, and the method requires an equivalent amount of organic acid, product or by-product, for each mole of catalyst salt recovered.

The second recovery method of Standard Oil, U.S. Pat. 3,341,470, also teaches evaporation of the acetic acid solution of reactants to dryness. This method recognizes the problems associated with recovery of the catalyst from the contaminant-loaded residue, and it begins with burning the residue to obtain the catalyst as oxides in the ash. However, this step is complicated by what the inventor refers to as "volatile ash" (possible carbonyls), which necessitates special equipment for processing the flue gas from the incinerator. The recovered ash is then treated with sulfuric acid and chloride ion to dissolve the metal ions into water, from which they are fractionally precipitated as carbonates or hydroxides, which are then converted to the desired acetate salts. This method, while it is better than the earlier Standard Oil method in that the recovered catalyst is obtained in pure form, also involves too many extra processing steps to be economically feasible.

In yet another process, the solvent and reaction product are separated and cobalt is recovered from the residue by digesting the residue in a mixture of water and acetic acid, followed by filtration to separate insoluble residue from dissolved cobalt. This system has the same deficiencies as U.S. Pat. 2,964,559.

It is an object of this invention to provide a catalyst recovery method which does not have the deficiencies associated with the prior art.

It is still another object of this invention to provide a simple process for catalyst recovery from the reaction products and by-products of the oxidation of an aliphatic substituted aromatic hydrocarbon and for regeneration of the catalyst.

SUMMARY OF THE INVENTION

Accordingly, we have now found that the oxidation catalyst present in the reaction solution resulting from the oxidation of aliphatic substituted aromtaic hydrocarbons to carboxylic acids may be readily recovered by adding a mineral acid directly to the reaction solution to precipitate the catalyst as a filterable salt. This recovery scheme has the advantage of requiring only stoichiometric amounts of cheap reagents and in using only simple equipment for precipitation and filtration.

An unexpected advantage of our scheme is that it works in non-polar reaction media such as toluene or xylene, as well as in polar reaction media such as acetic acid.

Yet another advantage of our scheme is the liberation of product acid that would otherwise be lost in the residue as salts of the catalysts under previous recovery methods.

DETAILED DESCRIPTION

Our recovery process is suitable for use in the recovery of oxidation catalysts such as cerium, neodymium, vanadium, cobalt and manganese. It is applicable to the recovery of such catalysts employed in the liquid phase oxidation of a wide variety of aliphatic substituted aromatic compounds. Generally speaking, the aliphatic side chain may contain up to about 4 carbon atoms in branched or straight chain configuration. Common examples of suitable feedstocks and of the resultant aromatic carboxylic acids are set forth in U.S. Pat. 2,964,559, column 2, lines 63 et seq. and U.S. Pat. 2,833,816, column 11 lines 22 et seq.

By the proper choice of feedstock and the selection of desirably mild or severe operating conditions, almost any aromatic monocarboxylic or polycarboxylic or substituted aromatic mono- or polycarboxylic acid may be produced. In all of these processes a similar problem of catalyst recovery is present and may be solved by resorting to the extraction procedure of this invention.

The recovery process may be included at any convenient point in the processing sequence following the initial oxidation step. For example, where a soluble product such as naphthoic acid is made, catalyst recovery is most easily effected by treating the effluent stream from the oxidation reactor before the recovery of the product. Where an insoluble product such as terephthalic acid is made, the product is recovered first by filtration, and the catalysts are then recovered by treating the filtrate.

The preferred mineral acids for precipitation of the catalysts are sulfuric acid, and phosphoric acid. Sulfuric acid is economically preferable. Hydrochloric acid may also be used but is less effective. Nitric and perchloric acids did not give insoluble salts with cobalt and manganese and thus are not useful. The acid employed may be dilute or concentrated having an acid strength of about 5 to 100%. Preferred is concentrated acid having an acid strength of about 50 to 96%. Where there is a possibility that a concentrated acid may react with other compounds present in the reaction solution, we prefer to use acid having an acid strength of about 25 to 50%.

The optimum amount of acid used is the stoichiometric amount. Lesser amounts would give only partial recovery of the oxidation catalysts, and greater amounts could lead to corrosion of equipment and/or chemical changes in the organic reactants.

The reaction temperature may vary widely, but it must be in the range where the solvent remains a liquid. Generally, we prefer temperatures in the range of about 20 to 150° C. The preferred temperature for the specific application is the prevailing temperature of the reaction mixture at the point where the catalysts are to be recovered. For example, with a soluble product like naphthoic acid, which would be recovered by distillation, catalyst recovery would be done with the solution at 110 to 130° C. With an insoluble product like terephthalic acid, the reaction mixture would be cooled to a temperature low enough to effect complete precipitation of the product, and recovery of the catalyst would then be run on the cool solution after product recovery by filtration.

Reaction time for precipitation of the catalysts may be from one minute to several hours. With the preferred sulfuric acid, catalyst recovery is essentially complete in two minutes. Catalyst precipitation is also very rapid with phosphoric acid, but the chloride salts precipitate slowly and require longer reaction times (from several hours to overnight).

The dried precipitate is then contacted with a caustic solution to form insoluble cobalt and manganese hydroxides. We prefer to use a 10% aqueous solution of sodium hydroxide; however, other concentrations and other caustic solutions may be used. Thus, the concentration may vary in the range of about 5 to 50% and the caustic may be KOH. A stoichiometric amount of caustic is preferably used, however an excess is not detrimental to the product quality.

The metal hydroxides are then dissolved in acetic acid when the acetate form of the catalyst is desired (aliphatic acid medium) or naphthenic acid when the naphthenate form of the catalyst is being used to regenerate the catalyst which may then be recycled to the oxidation reaction.

The following examples illustrate several embodiments of our invention, but are not intended to be limiting.

Example 1

A solution was prepared by mixing the following reagents: 250 grams (g.) of crude mixed monomethylnaphthalenes, 4.8 g. of reagent-grade cobaltous acetate (1.42 g. as cobalt), 13.5 g. of reagent-grade manganous acetate (3.32 g. as manganese), 8 g. reagent-grade ammonium bromide, and 1570 g. of glacial acetic acid. This solution was reacted with oxygen in a pressure vessel at 130 to 150° C. at a pressure of 50 pounds per square inch gage until reaction ceased. The solution was then cooled to room temperature, and 11.9 g. of reagent-grade concentrated sulfuric acid was added to the solution. This mixture was stirred for 5 minutes and then filtered to recover the precipitated cobaltous and manganous sulfates. The filtrate was subsequently distilled to recover the acetic acid solvent and the mixed naphthoic acids product.

The precipitate was dried to constant weight, 17.95 g., and analyzed. It contained 97.9 percent of the cobalt and 96.1 percent of the manganese originally present in the solution. A portion of the dry catalyst sulfate was stirred into a stoichiometric amount of a 10 percent aqueous solution of sodium hydroxide, and the water insoluble cobalt and manganese hydroxides were recovered by filtration. These catalyst hydroxides were then dissolved off the filter with warm glacial acetic acid into the oxidation reaction vessel. Fresh monomethylnaphthalene was added and the solution was diluted with acetic acid to the appropriate concentration of reactants and oxidized as described above. Oxidation of the methylnaphthalenes proceeded normally, giving better than 90 percent yield of naphthoic acids.

Example 2

Oxidation of a solution as described in Example 1 was repeated, and 11.9 g. of concentrated sulfuric acid was again added to the oxidized solution. This mixture was stirred for 2 minutes and then filtered. The cobalt and manganese sulfate precipitate was dried and analyzed. Cobalt recovery was 94.4 percent, manganese recovery was 96.4 percent.

Example 3

A solution was prepared and oxidized as in Example 1, and 11.9 g. of concentrated sulfuric acid was added to the oxidized solution. This mixture was stirred for 15 minutes and then filtered. The recovered dry precipitate contained 96.5 percent of the cobalt and 93.4 percent of the manganese originally charged to the oxidation.

Example 4

A stock solution was prepared to contain 0.411 g. manganous ion and 0.252 g. cobaltous ion per 220 milliliters (ml.) of glacial acetic acid. This stock solution was used in 220 ml. portions to test other mineral-acid precipitants. Where precipitates formed, the test mixture was filtered, and the precipitate was dried in a vacuum oven and analyzed. The following results were obtained in the test series.

| Acid used | Precipitate | Percent recovery | |
|---|---|---|---|
| | | Cobalt | Manganese |
| $H_2SO_4$ (96%) | Yes | 96.6 | 88.8 |
| $H_3PO_4$ (85%) | Yes | 102.5 | 83.4 |
| HCl (37%) | Yes | 72.8 | 63.5 |
| $HNO_3$ (70%) | No | | |
| $HClO_4$ (70%) | No | | |
| HCl (100%, gas) | No | | |
| $CO_2$ (100%, gas) | No | | |

We claim:
1. In a process for the preparation of aromatic carboxylic acids by the liquid phase oxidation of alkyl aromatics in a solvent selected from acetic acid, xylene or toluene by molecular oxygen with a minor proportion of catalyst containing divalent ions of metals from the group consisting of manganese and cobalt, said catalyst being soluble in said solvent, the improvement comprising: contacting an initial oxidation effluent stream containing the aromatic carboxylic acid reaction products and unreacted aromatics with a solution of a mineral acid selected from the group consisting of sulfuric, phosphoric and hydrochloric acid, said mineral acid being added in a stoichiometric ratio to said divalent metal ions to precipitate at least a major proportion of said divalent metal ions as a salt of said mineral acid, said mineral acid being added as a solution containing 25 to 96% by weight of mineral acid, precipitating said mineral acid salt, recovering the precipitated mineral acid salt, treating the precipitated mineral acid salt with an aqueous caustic solution to form water insoluble material, recovering said water insoluble material and dissolving said water insoluble material in an organic acid selected from acetic and naphthenic acids to recover a catalyst metal salt of said organic acid.

2. The process of claim 1 wherein the mineral acid is sulfuric acid.

References Cited

UNITED STATES PATENTS

| 3,067,248 | 12/1962 | Hetzel | 260—525 |
| 3,557,173 | 1/1971 | Trevillyan | 252—413 |
| 3,033,899 | 5/1962 | Knobloch et al. | 260—525 |
| 3,105,851 | 10/1963 | Knobloch et al. | 252—413 |
| 3,341,470 | 9/1967 | Hensley Jr. | 252—413 |
| 2,964,559 | 12/1960 | Burney et al. | 252—425 |

DANIEL E. WYMAN, Primary Examiner

P. E. KONOPKA, Assistant Examiner

U.S. Cl. X.R.

252—412, 413; 260—439 R, 525